(12) United States Patent
Möderl et al.

(10) Patent No.: US 10,612,191 B2
(45) Date of Patent: Apr. 7, 2020

(54) METHOD FOR PRODUCING A CELLULOSE SUSPENSION

(71) Applicant: LENZING AG, Lenzing (AT)

(72) Inventors: Ulrich Möderl, Thalgau (AT); Christoph Schrempf, Bad Schallerbach (AT); Heinrich Firgo, Vöacklabruck (AT)

(73) Assignee: Lenzing Aktiengesellschaft, Lenzing (AT)

( * ) Notice: Subject to any disclaimer, the term of this patent is extended or adjusted under 35 U.S.C. 154(b) by 446 days.

(21) Appl. No.: 14/382,808

(22) PCT Filed: Feb. 15, 2013

(86) PCT No.: PCT/AT2013/000027
§ 371 (c)(1),
(2) Date: Sep. 4, 2014

(87) PCT Pub. No.: WO2013/131113
PCT Pub. Date: Sep. 12, 2013

(65) Prior Publication Data
US 2015/0007952 A1     Jan. 8, 2015

(30) Foreign Application Priority Data

Mar. 5, 2012 (AT) ..................................... 279/2012

(51) Int. Cl.
| | | |
|---|---|---|
| D21C 3/20 | (2006.01) | |
| C08B 1/00 | (2006.01) | |
| D21C 9/00 | (2006.01) | |
| C08J 3/11 | (2006.01) | |
| D01D 1/02 | (2006.01) | |
| D01F 2/00 | (2006.01) | |
| D01F 2/02 | (2006.01) | |

(52) U.S. Cl.
CPC .................. *D21C 3/20* (2013.01); *C08B 1/00* (2013.01); *C08B 1/003* (2013.01); *C08J 3/11* (2013.01); *D01D 1/02* (2013.01); *D01F 2/00* (2013.01); *D01F 2/02* (2013.01); *D21C 9/005* (2013.01); *C08J 2301/02* (2013.01)

(58) Field of Classification Search
CPC .......... D21C 3/20; D21C 9/005; C08B 1/003; C08B 1/00; C08J 3/11; D01F 2/02; D01F 2/00; D01D 1/02
See application file for complete search history.

(56) References Cited

U.S. PATENT DOCUMENTS

| | | |
|---|---|---|
| 3,695,327 A | 10/1972 | Widmer |
| 4,246,221 A | 1/1981 | McCorsley, III |
| 4,416,698 A | 11/1983 | McCorsley, III |
| 5,378,439 A | 1/1995 | Delobel et al. |
| 5,603,883 A | 2/1997 | Zikeli |
| 5,626,810 A | 5/1997 | Zikeli et al. |
| 6,972,102 B1 | 12/2005 | Bauer et al. |
| 7,115,187 B1 | 10/2006 | Bauer et al. |
| 2008/0042309 A1 | 2/2008 | Zikeli et al. |
| 2011/0028608 A1* | 2/2011 | Innerlohinger ......... C08B 16/00 524/35 |

FOREIGN PATENT DOCUMENTS

| | | |
|---|---|---|
| DE | 2011493 A1 | 10/1970 |
| DE | 226573 A1 | 8/1985 |
| DE | 4441468 A1 | 5/1996 |
| DE | 19949720 A1 | 6/2001 |
| DE | 10013777 A1 | 10/2001 |
| EP | 0356419 A2 | 2/1990 |
| EP | 0419356 A1 | 3/1991 |
| EP | 0853642 B1 | 11/2002 |
| WO | 9406530 A1 | 3/1994 |
| WO | 9428217 A1 | 12/1994 |
| WO | 9511261 A1 | 4/1995 |
| WO | 9621678 A1 | 7/1996 |
| WO | 9633302 A1 | 10/1996 |
| WO | 9633934 A1 | 10/1996 |
| WO | 03029329 A2 | 4/2003 |
| WO | 2005113869 A1 | 12/2005 |
| WO | 2006108861 A2 | 10/2006 |

OTHER PUBLICATIONS

Google Machine Translation DE441468, Dec. 20, 2016.*
Google Machine Translation DD226573, Dec. 20, 2016.*
Smook, Handbook for Pulp and Paper Technologists, 1992, Angus Wilde Publications, 2nd edition, chapters 9, 11, 13, 14, and 16.and 26.*
Gotze, "Humidity of Pulp", Chemiefasem, p. 207 (1967).

* cited by examiner

*Primary Examiner* — Anthony Calandra
(74) *Attorney, Agent, or Firm* — Venable LLP

(57) ABSTRACT

The present invention relates to the preparation of a cellulose suspension, particularly of a premixture for the preparation of a cellulose suspension in organic solvents such as an aqueous N-methylmorpholine N-oxide (NMMO) solution.

16 Claims, No Drawings

METHOD FOR PRODUCING A CELLULOSE SUSPENSION

BACKGROUND OF THE INVENTION

Field of the Invention

The present invention relates to a method for preparing a cellulose suspension in organic solvents such as an aqueous NMMO solution, a substantially dry cellulosic raw material being mixed with the suspending agent in a slurrying unit, whereby a cellulose suspension is obtained, the cellulose suspension being squeezed to a cellulose content of 9-15%, and the moist cellulose being fed to a dissolution unit. Furthermore, the invention relates to a method for producing molded cellulosic bodies.

Description of Related Art

The production of molded cellulosic bodies such as fibers, filaments, foils by dissolving cellulosic raw materials and subsequent precipitation has been known for a long time. An example of such a method is the so-called amine oxide method wherein a cellulosic raw material is dissolved in a solvent, substantially consisting of an amine oxide, preferably N-methylmorpholine N-oxide (NMMO), and water, and is subsequently precipitated in the desired shape in an aqueous precipitation bath.

U.S. Pat. No. 4,246,221 describes an amine oxide method for the preparation of spinnable cellulose solutions, which as a base material uses, among other things, a mixture of cellulose in liquid aqueous N-methylmorpholine N-oxide (NMMO). According to this method a suspension of comminuted cellulose in the aqueous amine oxide solution is prepared in a discontinuously operating mixing apparatus and the mixture is heated simultaneously under reduced pressure, with water being removed and a first solution being prepared which, following filtration and postprocessing in an extruder, is transformed into a moldable solution. According to Example I, the mixing appliance used to prepare the cellulose suspension is a conventional double arm mixer. In this mixer, a suspension having a pulp consistency of about 20% by mass of cellulose is prepared. However, the above-described method has the disadvantage that it is discontinuous and difficult to implement at an industrial scale.

Furthermore, in U.S. Pat. No. 4,246,221 it is recommended, for the particularly gentle and rapid dissolution of the cellulose, to employ it and the (solid) amine oxide hydrate in a ground state. This is disadvantageous, however, as the cellulose will be damaged by the grinding process, e.g., if local overheating occurs. Furthermore, it is disadvantageous to employ a solid mixture of comminuted cellulose and comminuted amine oxide as a base material for the preparation of the cellulose solution, as it is known from EP-A-0 419 356 that a suspension of cellulose in an aqueous amine oxide can, with the help of thin film technology, be transformed into the moldable cellulose solution faster, gentler, and better.

U.S. Pat. No. 4,416,698 also recommends to those skilled in the art to grind the cellulose, namely, down to a particle size of less than 0.5 mm.

According to DD-A-226 573, the solution is prepared based on an NMMO-containing cellulose suspension having a low pulp consistency of no more than 2.5% by mass of cellulose. The NMMO concentration in the pure suspending medium is to be approx. 70% by weight. This cellulose suspension is homogenized in an agitator vessel. Subsequently, the pulp consistency is increased to 12.5% by mass by centrifuging or squeezing, the water content in the suspension is reduced to 10-15% by mass (related to NMMO), and finally the suspension is transformed into a clear solution in an extruder with a degassing zone at temperatures between 75 and 120° C. The method according to said DD-A-226 573 has, among other things, the disadvantage that, following the homogenization, the pulp consistency must be increased from 2.5% by mass to 12.5% by mass before it is possible to proceed to actually preparing the solution. Not only does this require a very large quantity of suspending medium that needs to be kept circulating, but also a substantial effort in order to separate the excess suspending medium again. While DD-A-226 573 mentions the method of squeezing, it does not provide any answers how this can be implemented in practice, especially at an industrial scale. For example, it is not disclosed to those skilled in the art how a consistent degree of squeezing, which is a prerequisite for a constant composition of the solution, can be obtained.

From WO 95/11261 of the applicant a method is known according to which (1) precomminuted cellulosic materials are introduced into an aqueous solution of a tertiary amine oxide in order to prepare a first suspension having a pulp consistency of at least 10% by mass of dry cellulose, (2) the first suspension is subjected to grinding, whereby a second suspension is obtained, and (3) the second suspension is transformed into the moldable cellulose solution by applying heat under reduced pressure. Grinding is used to further comminute occasional remaining pulp particles and split them into individual fibers. The grinding devices proposed are conventional high consistency mixers, dispersers, and refiners.

From WO 94/28217 a method for the preparation of a premixture of comminuted cellulose and aqueous amine oxide is known, wherefrom a moldable cellulose solution can be prepared. The base material used is pulp in roll form that is first precomminuted in a cutting machine (shredder). It is pointed out in WO 94/28217 that, when the pulp is cut, it should be ensured that it is compressed as little as possible at the cut edges, as this would otherwise make subsequent mixing with the aqueous amine oxide solution more difficult. For this purpose, a special cutting machine is recommended in which pulp pieces of a size of typically no more than 15 cm$^2$ are produced. As a side product of the cutting process, however, considerable quantities of pulp dust are generated. After cutting in the cutting machine, the precomminuted pulp is comminuted further in a fan having propeller blades and is transported by means of air to a screen where the precomminuted pulp is separated from the air flow. The screen separates all pulp particles having a size of at least 2.54 mm. The remaining air flow, however, still contains a significant portion of dust with particle sizes of less than 2.54 mm. To avoid losing this pulp, it is collected in a filtering device and finally united again with the larger pulp particles. To prepare the suspension, the comminuted cellulose and the amine oxide solution are introduced into a horizontally supported, cylindrical mixing chamber that has a rotor with axially spaced agitator members. The mixture is stirred in the mixing chamber by rotating the rotor at a speed of 40 to 80 revolutions per minute. Preferably, quickly rotating refiner blades are also provided at the wall of the cylindrical mixing chamber and used to comminute the pulp particles. The combined action of the agitator paddles and the quickly rotating refiner blades eventually yields a homogenous mixture that includes up to about 13% by mass of cellulose, related to the mass of the suspension. Nevertheless, this previously known method has the disadvantage that it is technically complex and very time-consuming to eventually prepare the homogenous suspension from the pulp in roll form. What is more, the previously known method is discontinuous and takes more than 20 minutes per batch just for mixing.

EP 0853642 notes, first of all, that conventional pulpers, as employed in various configurations in viscose technology or in the papermaking industry, cannot be used satisfactorily for the present objective, as they are said to permit the preparation of cellulose suspensions having a pulp consistency of no more than only 11.5%. The same document also notes that, due to the high degree of swelling of the pulp in 60-78% aqueous NMMO at the required processing temperature of 60-90° C., the flowability of the suspension would decrease to such a great extent that the pulp/NMMO/water mixture is no longer subject to sufficient shear and mixing throughout the entire mixed materials. In Comparison Example 5 contained therein, when using a conventional pulper, a 74% NMMO solution at 70-80° C., and the stepwise addition of pulp in sheet form without precomminution, it is established that the process had to be discontinued after about 12 minutes and after reaching a pulp consistency of 11.57, as no more increase of the pulp consistency was possible because no mixing was taking place in the peripheral zones and thus no suspension was obtained.

Instead, EP 0853642 proposes a method for preparing a homogenous suspension of cellulose in an aqueous solution of a tertiary amine oxide, wherein pulp is mixed with the aqueous solution of the tertiary amine oxide in a mixing apparatus that has a container to receive the suspension and a mixing tool, and which is characterized in that a mixing apparatus is employed whose container rotates during mixing. This should make it possible to prepare a cellulose suspension that can be fed directly into a dissolution stage. The aqueous solution of the tertiary amine oxide employed in this method contains the amine oxide, preferably NMMO, at between 60 and 82% by mass. The method is conveniently executed at a temperature between 60 and 90° C. This made it possible to prepare cellulose suspensions having a pulp consistency of more than 13% and, on top of that, to even use, for this purpose, a concentrated amine oxide solution having 78% by mass of NMMO. It was also noted, however, that these effects apparently cannot be obtained when using a mixer with an immovable, i.e., a non-rotating container and a rotating mixing tool.

WO 2005/113869 A1 finally describes a method and an apparatus for preparing a cellulose solution that can be extruded into endless molded bodies, wherein, at first, a cellulose suspension is prepared from cellulose and water in a pulper, which is subsequently squeezed with a squeezing means. Following squeezing, a tertiary amine oxide, particularly N-methylmorpholine N-oxide, is added as a solvent to the cellulose suspension in order to prepare a cellulose solution. This method has the disadvantage that large quantities of water are introduced into the cellulose, which must subsequently, when preparing the solution, be evaporated again by means of using a large amount of energy.

OBJECT OF THE INVENTION

It is the object of the present invention to provide an improved method for preparing the cellulose slurry, which, in particular, requires the use of as little energy as possible and can be executed on a simple system that consists of as few apparatuses as possible. In addition, operating such a method should be as safe as possible.

DESCRIPTION OF THE INVENTION

The solution to the above described object is a method for preparing a cellulose solution in organic solvents, characterized in that a. a substantially dry cellulosic raw material is mixed with a suspending agent in a slurrying unit, whereby a cellulose suspension with a cellulose content from 4.0-9.0% by weight is obtained;

b. the cellulose suspension obtained in step a. is squeezed to a cellulose content from 9.0-15.0% by weight;

c. the suspending-agent-moistened cellulose obtained in step b. is fed to a dissolution unit.

Preferably, the suspending agent is a so-called ionic solvent. Suitable ionic solvents are known, for example, from WO 03/029329 and WO 06/108861. Another suitable ionic solvent is the aqueous NMMO solution which has already been mentioned hereinabove and which has been used in the amine oxide method for many years at a commercial level. In a particularly preferred embodiment of the present invention, the suspending agent is therefore an aqueous NMMO solution. The dissolving capacity of such an aqueous NMMO solution for cellulose depends on the water content. Therefore, this embodiment provides for the additional evaporation of water in the dissolution unit until a homogenous cellulose solution has been obtained. Suitable dissolution conditions are known to those skilled in the art.

In step a. of this embodiment, the suspending agent is a 72 to 80% by weight aqueous NMMO solution the cellulose is mixed with at 60 to 85° C., and in step b. the cellulose suspension obtained in step a. is squeezed at 65 to 75° C. Minor deviations from these values may be possible from case to case and are still within the scope of the present invention.

The NMMO concentration of the solution employed in step a. is preferably 75 to 79% by weight of NMMO. It is important for the success of the method according to the invention to have a content of NMMO and water in the finished cellulose suspension that comes as close as possible to that of the cellulose solution that is prepared subsequent to step c.

If the cellulose content in step a. is less than 4.0% by weight, a very large amount of suspending agent would be necessary, which would have to be kept in circulation. Thus, all units of this circuit would have to be designed with very large dimensions and would consequently be expensive. If the cellulose content in step a. is more than 9.0% by weight, complete mixing would be hard to achieve with a conventional, commercially available slurrying unit, and, besides, in the event of such a composition of the container contents, the addition of the cellulosic raw material would not be possible without prior further comminution in the dry state, as the shearing action would not be sufficient because of the high cellulose content.

In step b., the cellulose suspension obtained in step a. is squeezed to a cellulose content of 9.0-15.0% by weight, wherein, by squeezing, the cellulose content is to be increased by at least one percent, preferably by 2 percent or more. A lower degree of squeezing does not make sense economically and would not justify the expense of the additional press. If the cellulose suspension is squeezed to a cellulose content of less than 9.0% by weight, then the cellulose solution obtained in the subsequent dissolution step will only have a cellulose content that is too low for typical types of use. Squeezing the cellulose suspension to a cellulose content of more than 15.0% by weight is associated with excessive and thus normally no longer economically justifiable expenses.

The invention also comprises analogous modifications of the described method that use other ionic solvents.

Preferably, the slurrying unit is a so-called pulper known from the papermaking and viscose industries. Its function is to separate the fibers of the cellulosic raw material as much as possible. In particular, for the method according to the invention, it is preferred to use a conventional high density pulper from the papermaking industry. However, it must be designed such that all parts in contact with the product can in any case be temperature-controlled. The agitator member, which is often referred to as the turbine, should, for the purposes of the present invention, be mounted at a certain distance from the container bottom of the pulper in order to achieve an optimum degree of mixing of the entire contents and optimum separation of the cellulose fibers.

Slurrying in step a. can be carried out either in a continuously operated slurrying unit or also by batches. In the second case, it is preferred to operate two pulpers alternately.

Preferably, the cellulosic raw material is fed to the slurrying unit in the form of sheets or rolls. Preferably, the cellulosic raw material—in most cases, it is wood pulp, and, more rarely, cotton linters—is used in sheet form, as many manufacturers prefer to deliver pulp in the form of sheets. If a pulper is used as slurrying unit, then no costly single sheet feeder will be necessary, but all it takes is a simple feeder that feeds several sheets simultaneously. Feeding in the form of flakes (so-called fluff pulp that is also commercially available) is also possible.

More preferably, the cellulosic raw material is fed into the slurrying unit without further prior comminution in the dry state. This is one of the big advantages of this invention over the state of the art, as this practically completely avoids the formation of dust, hardening at the cut edges, and the formation of aggregates. The separation of the fibers is achieved only by the shearing action in the pulper in the presence of the NMMO solution which immediately acts as suspending medium and prevents damage to the individual fibers.

Surprisingly, it has also become apparent that the solution quality is improved, presumably by the gentler opening of the sheet, as any mechanical stress the dry pulp sheet is exposed to will lead to disadvantageously compressed parts and particles in the spinning dope. The improved solution quality results in advantageous longer filter and nozzle lives.

Preferably, squeezing the cellulose suspension obtained in step a. is carried out using a belt filter press. It is the squeezing device best suited for the consistency range of the invention.

Preferably, squeezing is carried out between an upper and a lower filter belt. Such belt filter presses are generally known and commercially available, for example, from Andritz in Graz, Austria. The filter belts may consist of a conventional woven fabric that is generally used to squeeze pulp, for example, of a single-layer or multi-layer woven fabric of plastic or metal filaments. Possible plastic filaments can for example be polyester or polyamide filaments.

In such a press, the two filter belts are not disposed parallel to one another, but such that the spacing between them decreases from the point where the suspension is fed to the point where the press cake is discharged. In the wedge-shaped space between the filter belts, which continues to narrow, the squeezing action is achieved. For the purposes of the present invention, namely, squeezing of a cellulose suspension before preparing a solution, the belt filter press and its control must be configured such that this "wedge" is readjustable. Readjusting the wedge may be required, for example, if another cellulosic raw material exhibiting a changed swelling behavior is employed or if the fed suspension quantity varies.

A special embodiment of a belt filter press, which is also suitable, has an additional roller press unit downstream of the filter belt section. This roller press unit contains at least one, however, preferably two or more press rollers between which the press cake is squeezed yet further. This roller press unit should be readjustable, as well, so as to be able to control the squeezing action. This type of a belt filter press is used, for example, in the viscose industry in the form of a so-called "AC press".

When designing such a belt filter press it is absolutely necessary to ensure that the squeezed out NMMO solution is, in no place whatsoever, suctioned off by vacuum. This would cause water from the NMMO solution to evaporate, and NMMO would crystallize inside the press, thereby impairing its operability.

After squeezing the cellulose suspension, cellulose fibers and other residues are normally left behind on the filter belts. Therefore, the filter belts are cleaned inside the press during operation, preferably by using aqueous NMMO solution whose composition matches the NMMO solution employed in step a. On the one hand, this helps achieve an optimum cleaning action, while, on the other hand, it does not cause any additional water to be introduced into the pulp in this procedural step, which would have to be evaporated again.

For the method according to the invention, it has proven to be particularly advantageous to load the belt filter press with 1000-3000 g/m$^2$ of suspension. Lower loads do not guarantee cost-effective operation; in the case of higher loads, the squeezing action on the highly swollen cellulose suspension is insufficient.

Alternatively, squeezing can also be carried out by means of a screw press. In this case, the screen geometry must be dimensioned according to the fiber dimensions and the high pressure needed for squeezing, which, however, will not pose any difficulty to those skilled in the art who know the present invention. Other possible apparatuses that can be used to separate excess suspending agent from the swollen cellulose are, for example, centrifuges and decanters.

For the smooth execution of the method according to the invention, all parts of the press that are in contact with the product must preferably be kept at a temperature of 60-85° C., if an aqueous NMMO solution is used as suspending agent. If the method is to be carried out by means of the above described belt filter press, all parts that are in contact with the product must, for consistent temperature control, be disposed within one encapsulation. The filter belts must at all times be kept at said temperature along their entire length, even during cleaning. In other words, this means that the belt filter press must be completely encapsulated. Preferably, the temperature of the parts that are in contact with the product should be equal to or greater than the melting temperature of the NMMO solution employed in step a.

Between step b. and step c., a comminution of the press cake can be carried out by means of units known to those skilled in the art, for example, by means of a defiberizer. This depends on the consistency of the press cake and thus, among other things, on the type of the cellulosic raw material.

The press liquor obtained in step b. can be reused for the preparation of the suspension in step a. For this purpose, it is preferably returned to the slurrying unit without any further cleaning.

In a preferred embodiment, the cellulose slurry is stored temporarily in a container between step a. and step b. For this purpose, a buffer container is installed between the slurrying unit and the press. This container primarily serves as a buffer to compensate for production variations in continuous operation, or when switching from one slurrying vessel to another in batch operation. The contents of the buffer container are mixed well by means of an agitator so as to avoid settling or demixing or the cellulose suspension during longer dwell times. In addition, it must be heated in order to avoid cooling of the contents and thus, for example, crystallizing of NMMO.

Furthermore, the invention relates to a method for preparing a moldable cellulose solution, which is characterized in that a homogenous suspension prepared according to the inventive method is, under the evaporation of water, processed into a moldable cellulose solution. The preparation of the cellulose solution is carried out conveniently in a thin film treatment apparatus. Such a method is described, for example, in EP-A-0 356 419. One embodiment of a thin film treatment apparatus is, for example, a so-called filmtruder as manufactured by Buss AG (Switzerland). DE-A 2 011 493 also describes a thin film treatment apparatus. Usually, a mixture of cellulose and aqueous NMMO solution, which for the purposes of the present invention is to be referred to as cellulose suspension, is fed to the filmtruder. In the filmtruder itself, a portion of the water from this mixture is evaporated, with the cellulose being dissolved. WO 94/06530, published in the year 1994, uses the thin film technology already known from EP-A-0 356 419 in order to obtain a moldable solution from a mixture of cellulose in an aqueous solution of a tertiary amine oxide.

The present invention further relates to a method for producing molded cellulosic bodies, which consists in that a cellulose suspension prepared according to the invention is transformed into a moldable cellulose solution which is subsequently processed into foils, fibers, membranes, or other molded bodies in a per se known manner.

The suspension prepared according to the invention can be fed into the filmtruder, directly via a dosing device, or via a suitable buffer container as described, for example, in PCT/AT96/00059 of the applicant and in WO 94/28217, where it can be processed into a solution. The suspension prepared according to the invention can also be transformed into the cellulose solution in other devices.

It will be understood by those skilled in the art that in the method according to the invention also mixtures of various pulps can be employed to prepare the suspension. In addition, auxiliary materials and functional additives such as stabilizers, dispersants, auxiliary spinning agents, reactivity-enhancing reagents, incorporation media of an anorganic or organic nature (barite, activated carbon, $SiO_2$, CMC, $BaSO_4$, flame retardant substances such as Aflammit, modifiers (polyethylene glycols)), and other polymers such as nylon, or also colorants can be added to the suspension as early as in the slurrying unit. Admixing such auxiliary materials is, depending on the nature of the respective substance and related to the cellulose quantity, possible up to an amount between 0.1 and approx. 80%, if the final product is to be a molded cellulose body that is not shaped under the influence of distortion forces. If the final product is to be a molded cellulose body that is shaped under the influence of distortion forces, for example, a cellulose fiber, a cellulose filament, or a cellulose foil, then admixing such auxiliary materials is, also depending on the nature of the respective substance and related to the cellulose quantity, possible up to an amount between 0.1 and approx. 60%, as the auxiliary materials may cause problems during distorsion.

Compared to methods known in the art that include dry grinding the pulp prior to preparing the suspension, the invention presented herein requires, among other things, a system that is substantially less complex. This advantage becomes particularly apparent when sheet pulp is to be used, as in that case entire units—such as a sheet feeder or the like—will become omissible. Since in many cases manufacturers only offer pulps either in the form of sheets or rolls, use of the invention presented herein also permits a more flexible supply with raw materials. In addition, the energy consumption is lower than for the combination of a mill with a subsequent pneumatic transport of the ground pulp to slurrying. Particularly, also the safety technology is considerably simpler than in the state of the art, as no dust explosion protection is required. This also significantly reduces the annual maintenance costs.

EXAMPLE

In a pulper, a suspension with 5% by weight of cellulose was prepared from a beech pulp with an average fiber length of 0.61 mm and a water retention value (WRV) of 80% and a 78% by weight aqueous NMMO solution serving as suspending agent. This suspension was placed on a twin belt filter press (TWT type from Andritz in Graz, Austria). Placing was carried out at a temperature of 70° C. and a filter belt load of 2000 $g/m^2$. The filter belt velocity was 10 m/min. This way, a consistency of 14% by weight of cellulose could be obtained.

Further experiments demonstrated that, with a filter belt load of less than 1000 $g/m^2$ or more than 3000 $g/m^2$, no satisfactory results could be obtained. At 1000 $g/m^2$, only a consistency of 11% by weight could be obtained. The layer was too thin for effective squeezing. At 3000 $g/m^2$, only a consistency of 7.5% by weight could be obtained. The layer was too thick for effective squeezing.

What is claimed is:

1. A method for preparing a cellulose solution in a suspending agent, comprising
   a. mixing a substantially dry cellulosic raw material with the suspending agent in a slurrying unit, wherein the suspending agent is an ionic solvent, whereby a cellulose suspension having a cellulose content from 4.0-9.0% by weight is obtained;
   b. squeezing the cellulose suspension obtained in step a. in a press to a cellulose content of 9.0-15.0% by weight to obtain a suspending-agent-moistened cellulose and a press liquor; and
   c. feeding the suspending-agent-moistened cellulose obtained in step b. to a dissolution unit.

2. The method according to claim 1, wherein the slurrying unit is a pulper.

3. The method according to claim 1, wherein the press is a belt filter press.

4. The method according to claim 3, wherein the squeezing takes place between two filter belts.

5. The method according to claim 4, further comprising cleaning the filter belts with a suspending agent whose composition may match that of the suspending agent employed in step a.

6. The method according to claim 3, wherein the belt filter press is loaded with 1000-3000 grams suspension/$m^2$.

7. The method according to claim 1, wherein the press is a screw press.

8. The method according to claim 1, wherein the suspending agent is an aqueous NMMO solution.

9. The method according to claim 8, wherein in step a. the mixing of the substantially dry cellulose raw material occurs at 60 to 85° C. and the suspending agent is a 72 to 80% by weight aqueous NMMO solution and in step b. the squeezing of the cellulose suspension obtained in step a. occurs at 65 to 75° C.

10. The method according to claim 8, wherein all parts of the press that are in contact with the cellulose suspension and the obtained suspending-agent-moistened cellulose are kept at a temperature of 60-85° C.

11. The method according to claim 8, wherein the temperature of all parts of the press that are in contact with the cellulose suspension and the obtained suspending-agent moistened cellulose is equal to or greater than the melting temperature of the NMMO solution employed in step a.

12. The method according to claim 1, wherein the press liquor obtained in step b. is returned to be reused in the mixing of substantially dry cellulosic raw material in step a.

13. The method according to claim 1, wherein between step a. and step b. the cellulose suspension is stored temporarily in a container.

14. The method according to claim 1, further comprising feeding the cellulosic raw material to the slurrying unit in sheet form, roll form, or bale form.

15. The method according to claim 1, further comprising feeding the cellulosic raw material into the slurrying unit without any prior comminution.

16. A method for preparing a cellulose solution in a suspending agent, comprising a. mixing a substantially dry cellulosic raw material with the suspending agent in a slurrying unit, wherein the suspending agent is an ionic solvent, whereby a cellulose suspension having a cellulose content from 4.0-9.0% by weight is obtained;

b. squeezing the cellulose suspension obtained in step a. in a press at 65 to 75° C. to a cellulose content of 9.0-15.0% by weight to obtain a suspending-agent-moistened cellulose and a press liquor; and c. feeding the suspending-agent-moistened cellulose obtained in step b. to a dissolution unit.

\* \* \* \* \*